United States Patent [19]
Lianza et al.

[11] Patent Number: 5,892,585
[45] Date of Patent: Apr. 6, 1999

[54] COLORIMETER FOR MEASUREMENT OF TEMPORALLY VARIANT LIGHT SOURCES

[75] Inventors: Thomas A. Lianza, Bedford, N.H.; Richard A. Federico, Reading, Mass.

[73] Assignee: Sequel Imaging, Londonderry, N.H.

[21] Appl. No.: 835,084

[22] Filed: Apr. 4, 1997

Related U.S. Application Data

[60] Provisional application No. 60/014,904 Apr. 5, 1996.
[51] Int. Cl.$^6$ ................................................ G01N 21/25
[52] U.S. Cl. ........................................ 356/405; 356/406
[58] Field of Search ................................ 356/405, 406, 356/402–404, 407–411, 414, 419, 319, 417, 418; 364/526, 571.01–571.08; 348/179, 189, 191; 250/252.1; 280/226; 354/890, 723; 702/85–107

*Primary Examiner*—K. P. Hantis
*Attorney, Agent, or Firm*—Scott J. Asmus; Vernon C. Maine

[57] ABSTRACT

A colorimeter method and apparatus is described that is used to accurately deduce the color of a source which is varying in intensity with respect to time. The colorimeter consists of a plurality of sensors with varied spectral responsivity, a means of shielding these sensors from the effects of ambient illumination and a computational element to analyze the temporal and intensity variation of the signal under measurement. The output from the sensors is integrated and analyzed based upon the measured light intensity, time variant, and characteristics of the source. Sources such as CRT monitors, Flat Panel displays, and stroboscopic illuminators, are typical representations of time variant sources.

14 Claims, 12 Drawing Sheets

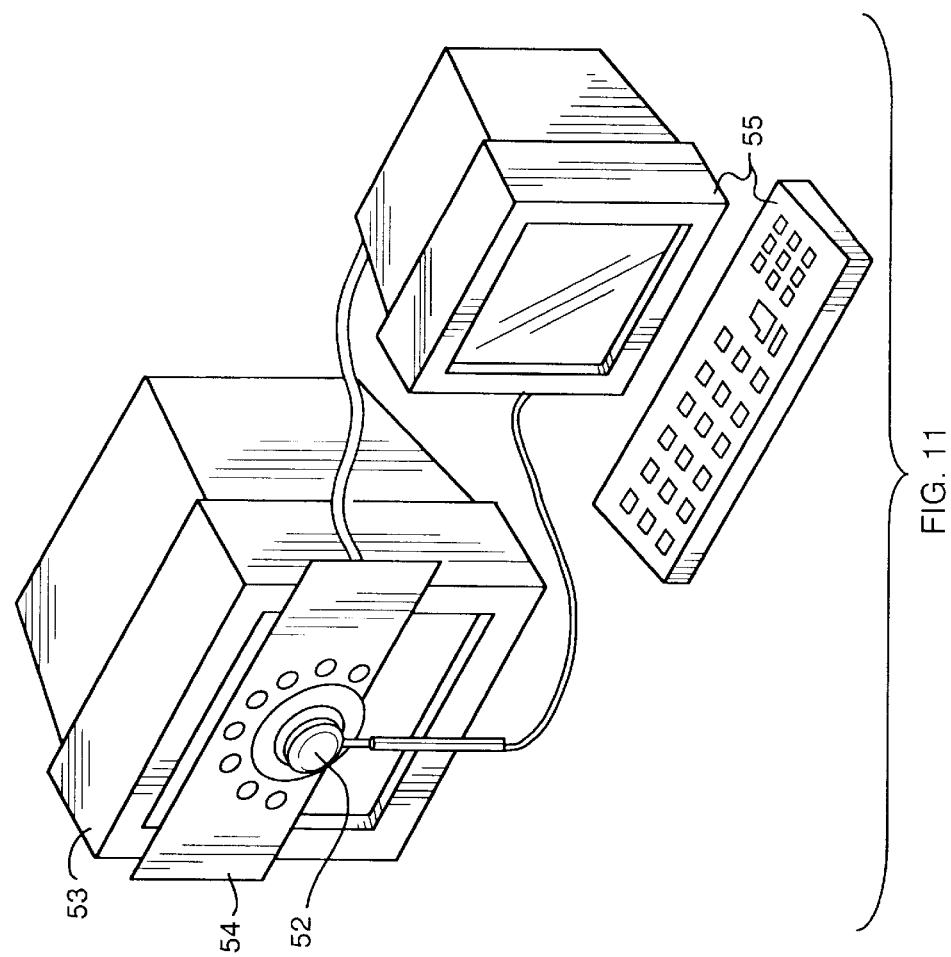

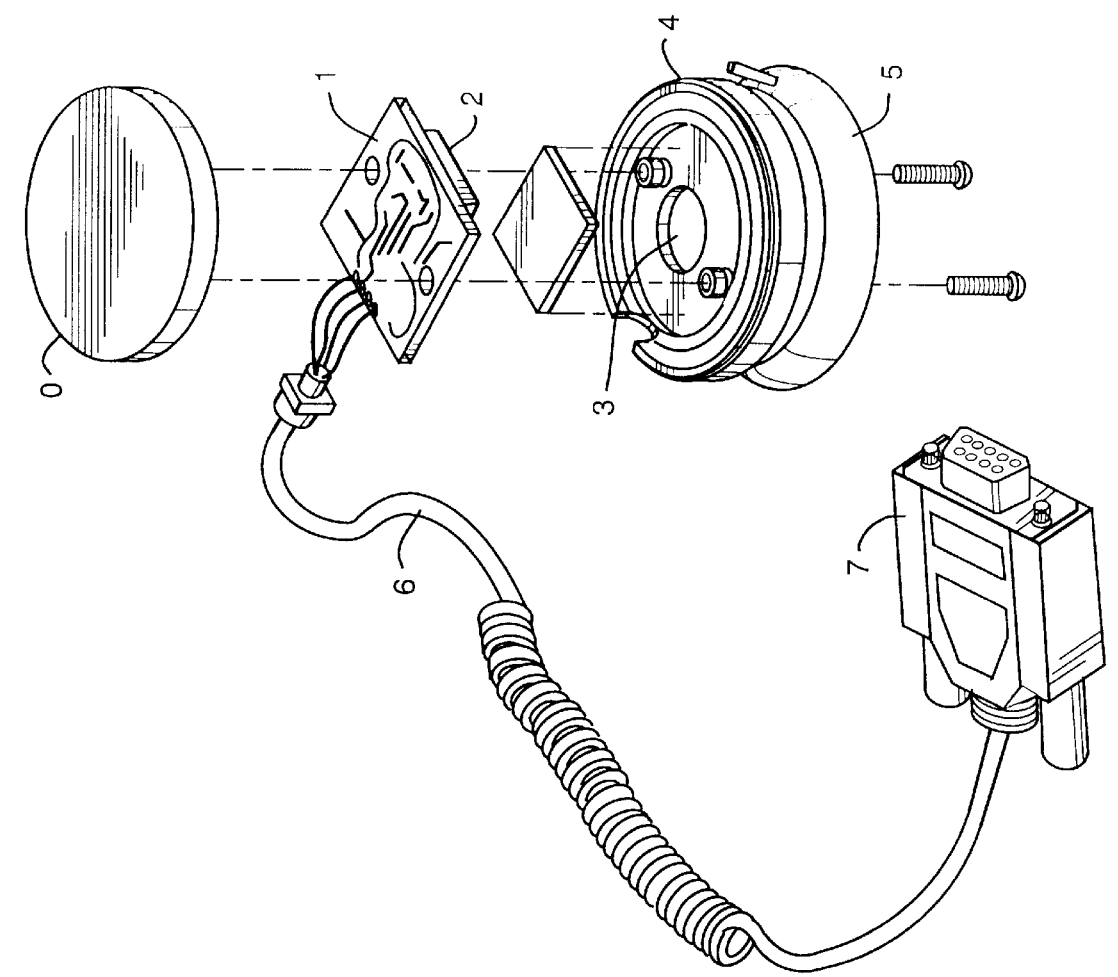

COLORIMETER FOR MEASUREMENT OF TEMPORALLY VARIANT LIGHT SOURCES

The Instant Application hereby claims the benefit under 35 USC 119(e) of U.S. provisional application Ser. No. 60/014,904 filed filed Apr. 5, 1996, now pending.

BACKGROUND OF THE INVENTION

1. Technical Field of the Invention

This invention relates to colorimeters, and more particularly to colorimeters capable of measurement of emitted light from sources that are temporally active.

2. Background Art

The measurement of color is a complex task. The complexity arises from the need to correlate the measurements made by an instrument with the impressions or sensations perceived by the human observer. Much of the prior art is devoted to instrument design that accomplishes the task within the framework of the known requirements for scenes that are continuously illuminated for sources which do not vary over time.

When light sources are temporally variant, and their effects are to measured relative to human responses, it is necessary to carefully separate artifacts that may be detected by the instrument from artifacts which affect the human perception. One method of elimination of temporal variation is to electronically filter the variation out using well known electrical and analytical techniques. The problem with this technique is that it increases measurement times. This increase in measurement time may be a problem in industrial applications which require that measurement times be short.

Automated adjustment and calibration of a CRT while on the assembly line is a typical task which requires minimal measurement time. The monitor adjustments must be servoed by the measurement device and the time of measurement must be short. The monitor is essentially a flashing source, and if the colorimeter is not properly synchronized with the vertical refresh rate of the monitor, the measurements will be very unreliable.

Another typical application is colorimetric analysis of colors on web presses during the production run of a newspaper or magazine. In situations like this it is often useful to use a strobe illuminator to "freeze" the movement of the web. This is done by flashing a source for a very short period. This flash effectively acts as shutter.

Yet another application of this technology is in the automatic calibration of hardcopy within a color copier. A test pattern is printed and examined by the sensor while still in the copier. Colorimeteric information is collected and sent back to a calibration subsystem to adjust the color balance of the media.

SUMMARY OF THE INVENTION

The present invention utilizes unique and low cost methodologies to determine a source's temporal characteristics and then adapt to those characteristics to allow for rapid measurement of active sources. In addition to this, the present invention uses a data analysis technique which eliminates the need for analog to digital converters or other complicated analog data acquisition components. The calibration of this device allows for use and selection of low cost filters without degradation in colorimeteric performance.

Accordingly, it is an object of the present invention to provide an improved colorimeter for measurement of temporally varying light sources.

It is a further object of the invention to provide a simplified, low cost architecture to achieve the goals of accurate, high-speed measurement of time varying illumination.

It is yet another object of the invention to provide an improved colorimeter for measurements of active sources in conditions of low light levels.

It is another object of this invention to provide a simplified, low cost method of filtering the illumination and calibrating the device based upon this filtration.

It is yet another object of the invention to provide measurement capability of incident or reflected time variant illumination.

Still another object of this invention is provide a colorimeter that easily interfaces to most computers to provide highly accurate digital data over a wide dynamic range of measurement.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

BRIEF DESCRIPTION OF THE DRAWINGS

FIG. 10 is a representation of the matrix mathematics used to calculate the calibration matrix.

FIG. 11 is a representation of a computerized calibration station.

FIG. 12 is an exploded perspective view of the best mode device.

DESCRIPTION OF THE PREFERRED EMBODIMENT

Brief Description of the Preferred Embodiment

A colorimeter, comprising three sensors for sensing incident intensity and a single sensor for sensing the frequency or occurrence of a flash, utilizing a light to frequency conversion process is used for the measurement of temporally active sources.

When measuring a CRT, the colorimeter is physically attached using an integrated suction cup that surrounds the sensing elements to shield the sensors from ambient illumination. When used in remote sensing or for industrial applications, the colorimeter can be used in conjunction with an imaging lens assembly to provide for variable area viewing.

The frequency sensor may be used to trigger a measurement upon sensing a flash, or to determine the frequency of a continuously flashing source, such as a CRT.

The intensity sensors convert light intensity to an electrical current that is then converted by a current to frequency sensor to a stream of electronic pulses whose frequency is proportional to the intensity striking the detector. The stream of electronic pulses is accumulated in a digital counter over a predetermined period of time that is based upon the detected frequency of the time variant light intensity. This integrated count, from each of the three filtered light intensity sensors represents a raw, un-calibrated estimate of the colorimetric signal. The count values derived from each of the three sensors are multiplied by an integration time calibration constant. These time corrected values are then multiplied by a correction matrix to yield values that are representative of the human visual process as specified by the C.I.E.

The calibration process is accomplished on a calibration station that uses a CRT as a temporally variant light source. When calibrating the device as a colorimeter, the CRT source is characterized using a spectrophotometer. An attached computer then displays colors on the CRT. The device under test is then used to measure these colors. The integration time for measurement at calibration is based on the frequency of the refresh of the CRT. A calibration matrix is derived to map the raw count information to a useful CIE colorimetric value. This calibration matrix, the frequency of the monitor, and length of time that was used for the measurement are stored in the colorimeter device. When calibrating a device as a luminance measurement device, a similar method is used, but the calibration values are based only on the number of sensors used in the device.

The invention is susceptible of many variations. Accordingly, the drawings and following description of the preferred embodiment are to be regarded as illustrative in nature, and not as restrictive.

Figure 1A:
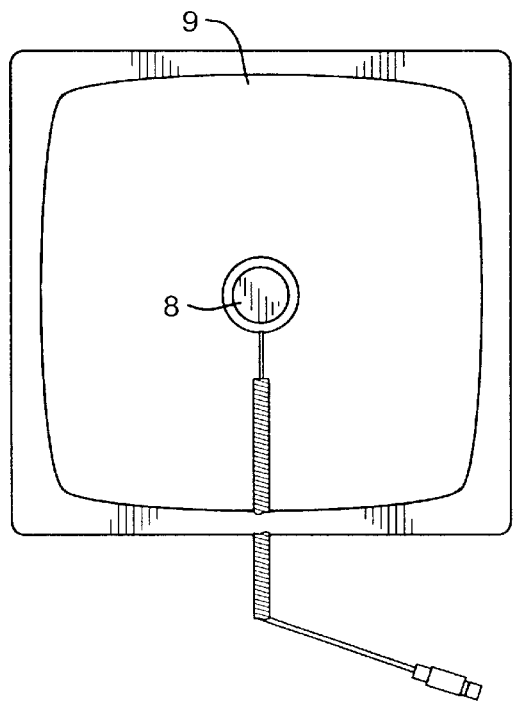
FIG. 1A is a front perspective view of a colorimeter attached to the normal center of a CRT.
Figure 1B:
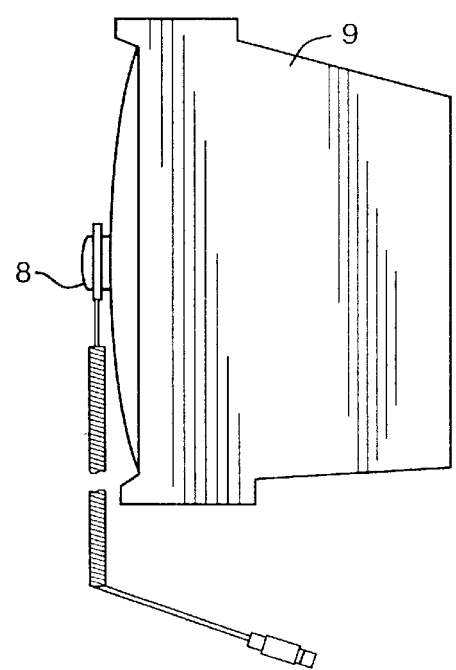
FIG. 1B is a side perspective view of a colorimeter attached to the normal center of a CRT.

A further description of the drawings follows:

FIGS. 1A and 1B are a representation of the approximate physical size of the colorimeter (8) when attached to CRT monitor (9).

Figure 2:
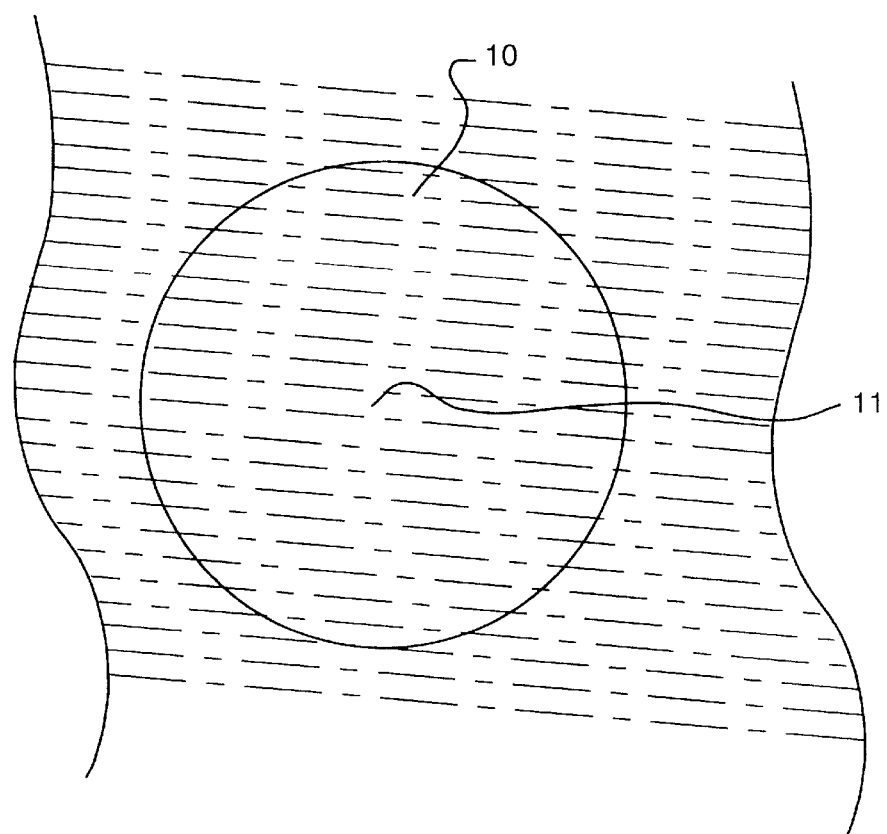
FIG. 2 is representation of the circular field of view of the sensor system of FIG. 1.

FIG. 2 is a representation of the field of view of the face of the monitor (9) when the calibrator (8) is attached. FIG. 2 illustrates that the field of view is circular and that the the total area of a line observed at the top of the field (10) is less than the area of the line in the center of the field (11).

Figure 3:
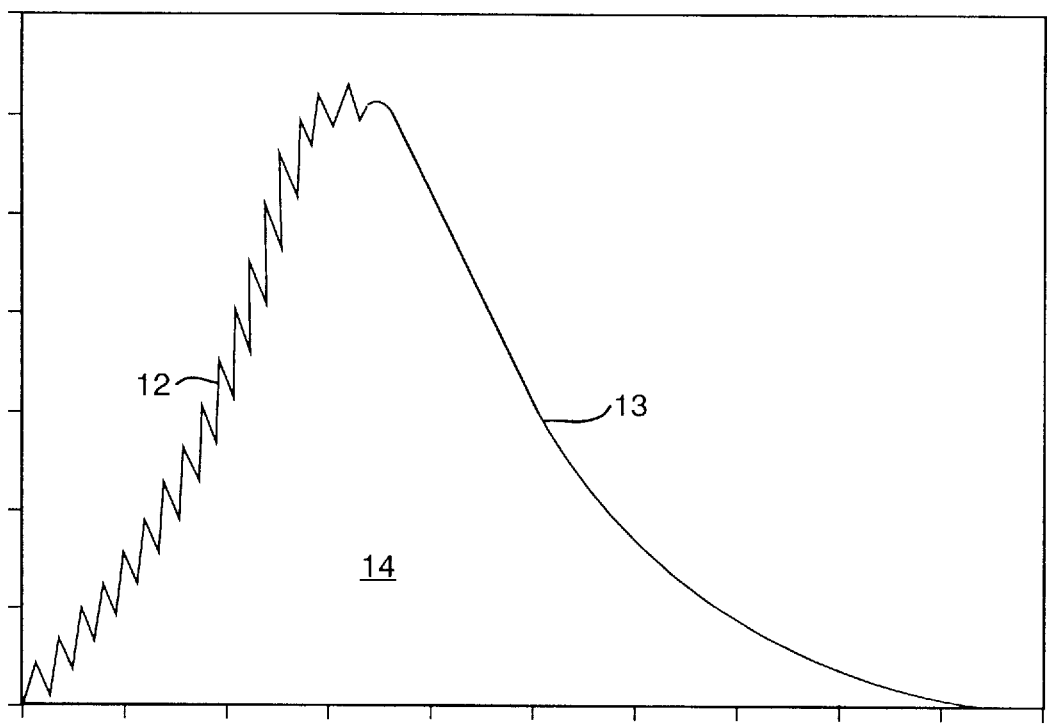
FIG. 3 is a representation of the instantaneous illumination falling on the sensor of FIG. 2.

FIG. 3 is a representation of a physical measurement of the relative intensity of the recorded signal as a function of time for a single period of the display vertical refresh time. The leading edge of the response (12) is characterized by a constant increase in signal level that is proportional to the length of a given scan line (10, or 11). The periodic nonuniformity on the leading edge of the signal (12) is due to the vertical refresh of the monitor. The trailing edge of the waveform (13) is due to the decay of the combined images of the lines within the aperture of the measurement (3, FIG. 12). The integrated area under the curve, over time, (14) represents the signal that is proportional to the response that the human eye can respond to.

Figure 4:
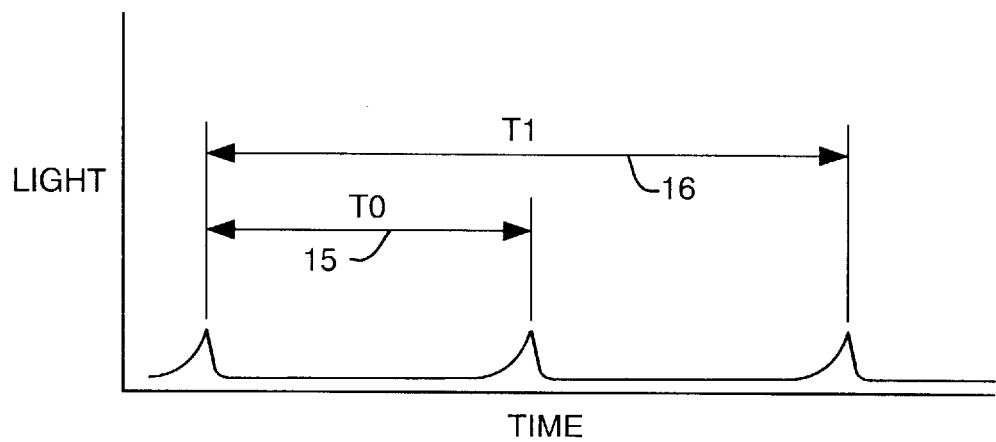
FIG. 4 is a representation of the periodic function of the display of FIG. 3.

FIG. 4 is a representation of the periodic nature of of the curve represented by FIG. 3. The time between vertical refresh rates is represented by T0 (15). For the purposes of measurement, an integer number of refresh rates T1 (16) must be used for purposes of integration of the signal.

Figure 5A:
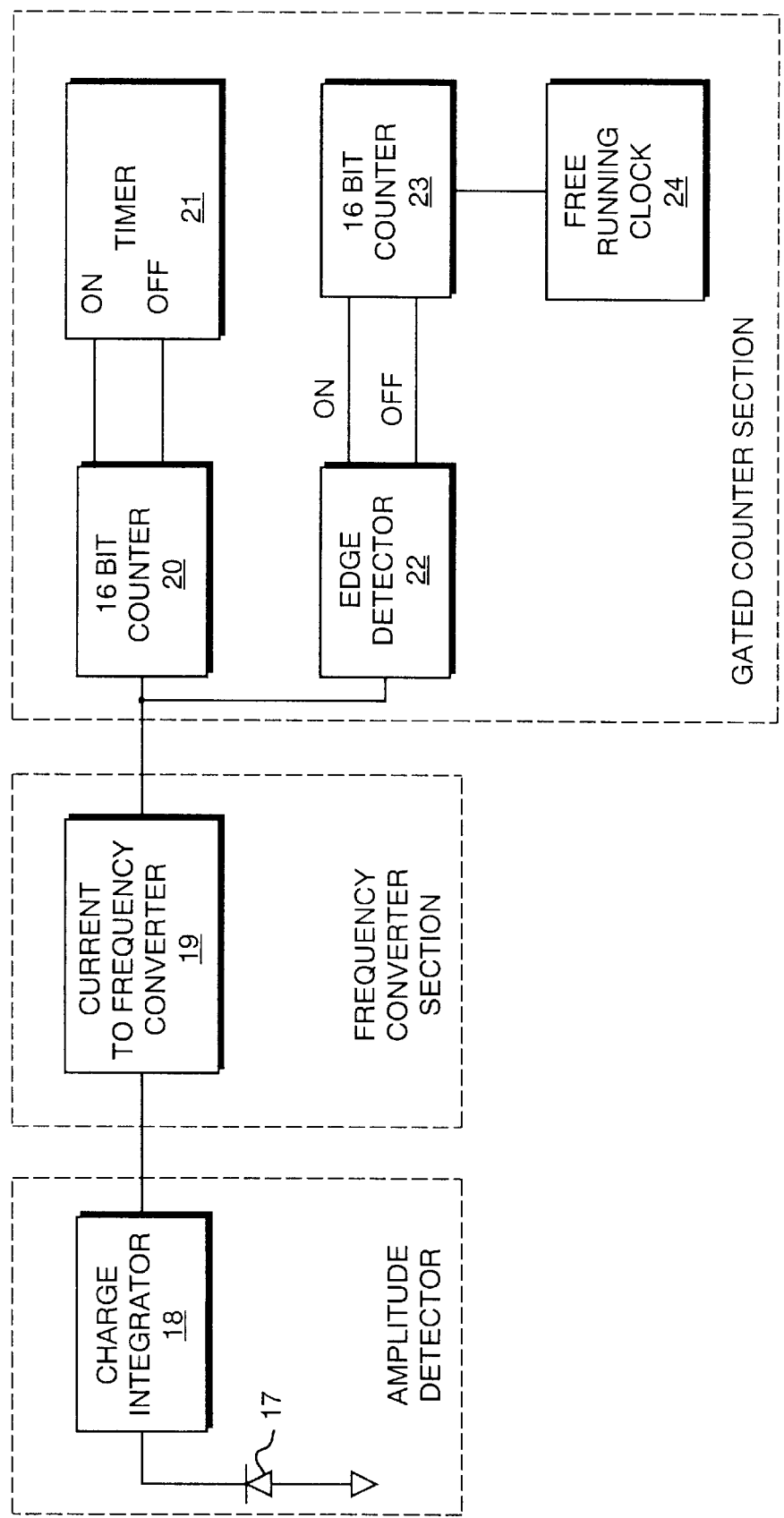
FIG. 5A is a block diagram representation of the amplitude detection section, the frequency converter section, and the gated counter section of a dual mode colorimeter.

FIG. 5A is a representation of the unique dual mode amplitude integrator used in the present invention. This consists of a PIN photodiode (17) whose output photoelectronic current is integrated over time in a charge integrator (18). The output of said charge integrator is converted to a current and then a frequency using the current to frequency stage (19). The output of the current to frequency converter can be analyzed either via an accumulating counter (20) which is gated on and off via host command (21) and/or through an edge detector (22) which is used to gate another counter (23) that is accumulating the output of a constant frequency counter (24).

Figure 5B:
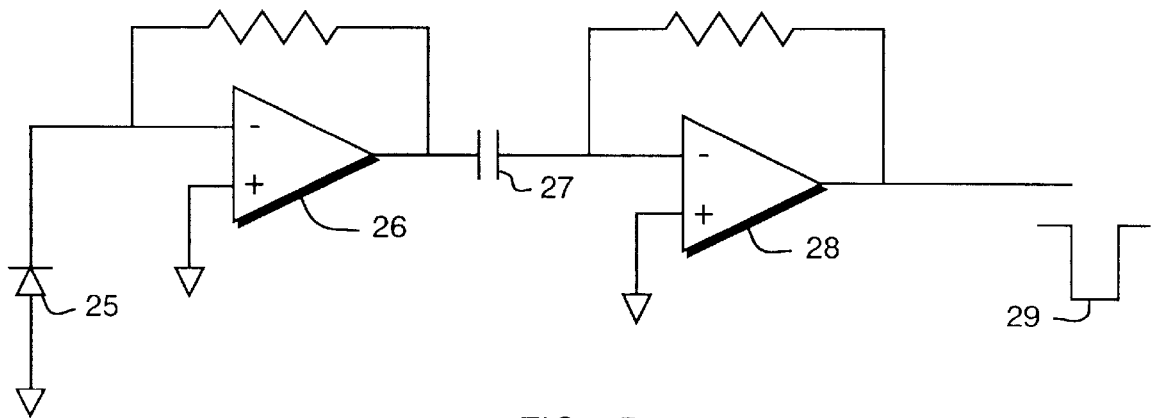
FIG. 5B lock diagram of the source frequency detection system of a dual mode colorimeter.

FIG. 5B is an electronic schematic representation of the Frequency Detect Sensor used in the colorimeter. The output of the PIN photodiode (25) is amplified (26) and AC coupled through capacitor (27), the result of which is again amplified by amplifier (28) producing a pulse output (29).

Figure 5C:
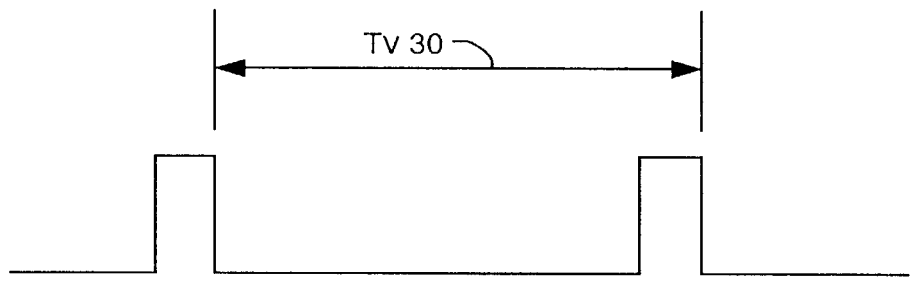
FIG. 5C is a representation of the vertical refresh time as detected in FIG. 5B.

FIG. 5C is a representation of the pulse output of the circuit represented in FIG. 5B. The time between pulses Tv (30) represents the vertical refresh time of the display system and is directly used to determine the time T0 (15), FIG. 4.

Figure 6:
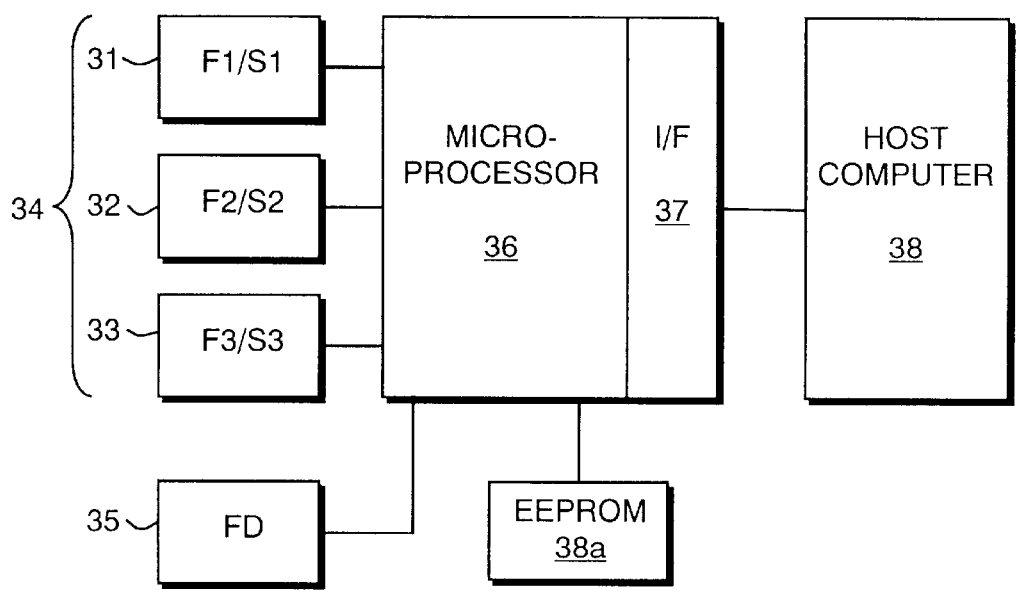
FIG. 6 is representation of the complete colorimeter system.

FIG. 6 is a block diagram representation of the electronics of the colorimeter. Element 34 is a combination of Sections 31 thru 33 that each represent the dual mode amplitude integrator described in FIG. 5A. Element (35) is a frequency detection circuit that is represented by FIG. 5B. These circuits are analyzed by microprocessor (36) and communicate the results via host interface (37) to any host computer (38).

Figure 7A:
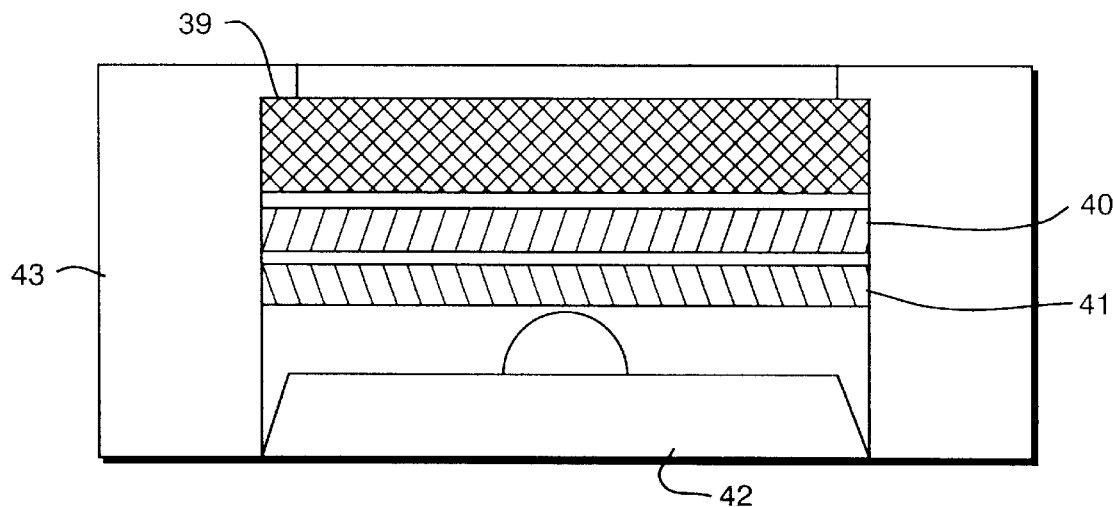
FIG. 7a is a representation of the construction of the filters which cover the sensor sets.

FIG. 7a is a block representation of the construction of the filter assembly housing.

Figure 7B:
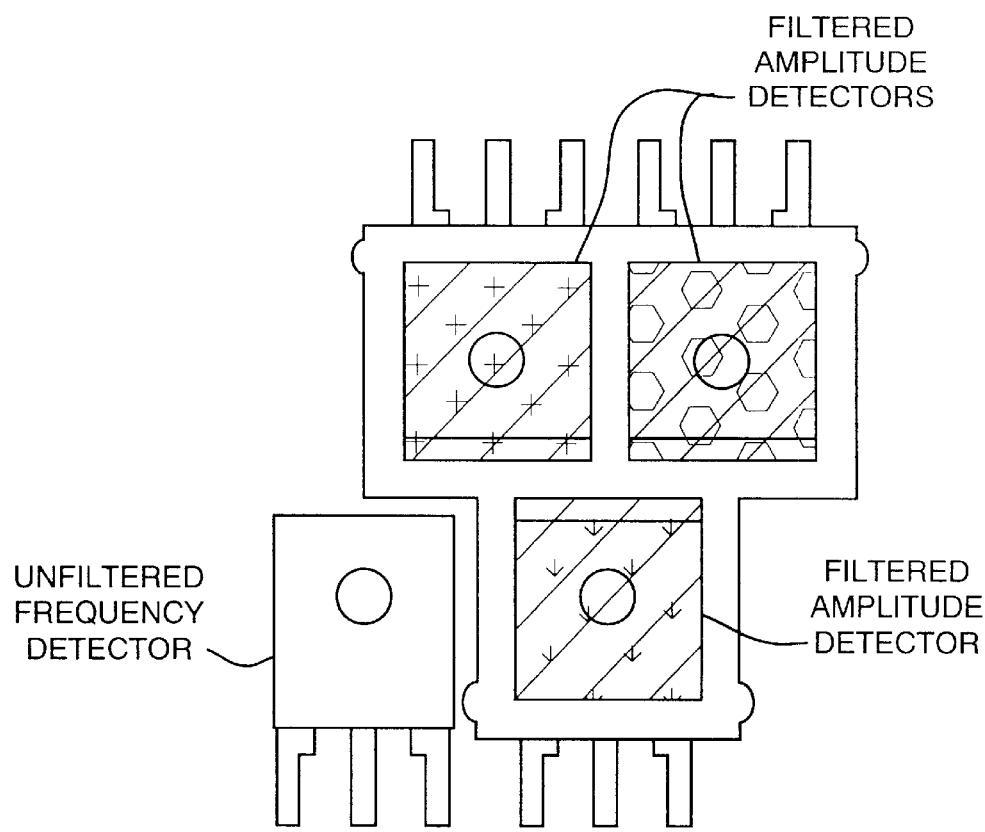
FIG. 7b shows the placement orientation between the filters and the frequency and amplitude detection sections.

A common sensor filter (39) is used to act as a primary filter in conjunction with combinations of filter material (40) (41) and detector (42). The Filter housing (43), shields the detector from all extraneous radiation that has not been directly transmitted through the filters. The sensor that is used to detect the frequency of the source is located in the same plane as the filtered sensors. In this embodiment, this sensor is unfiltered and has a spectral response defined, by the native response of the silicon sensor. The layout of all the sensors in the current embodiment is shown in FIG. 7b. In this best mode form, there are four sensors: three to detect amplitude and one to detect the frequency of the source. When this embodiment of the invention is used to measure color, the filter material is chosen to have the desired response to achieve the required spectral sensitivity to reduce the difference between the two phosphor sets. If the invention is used to measure only the luminance of the display, three filter packs are used that have equal relative spectral distributions, but have different levels of absolute transmittance. Doing this allows the detector system to measure a very large dynamic range display without loss of precision or accuracy.

Figure 8:
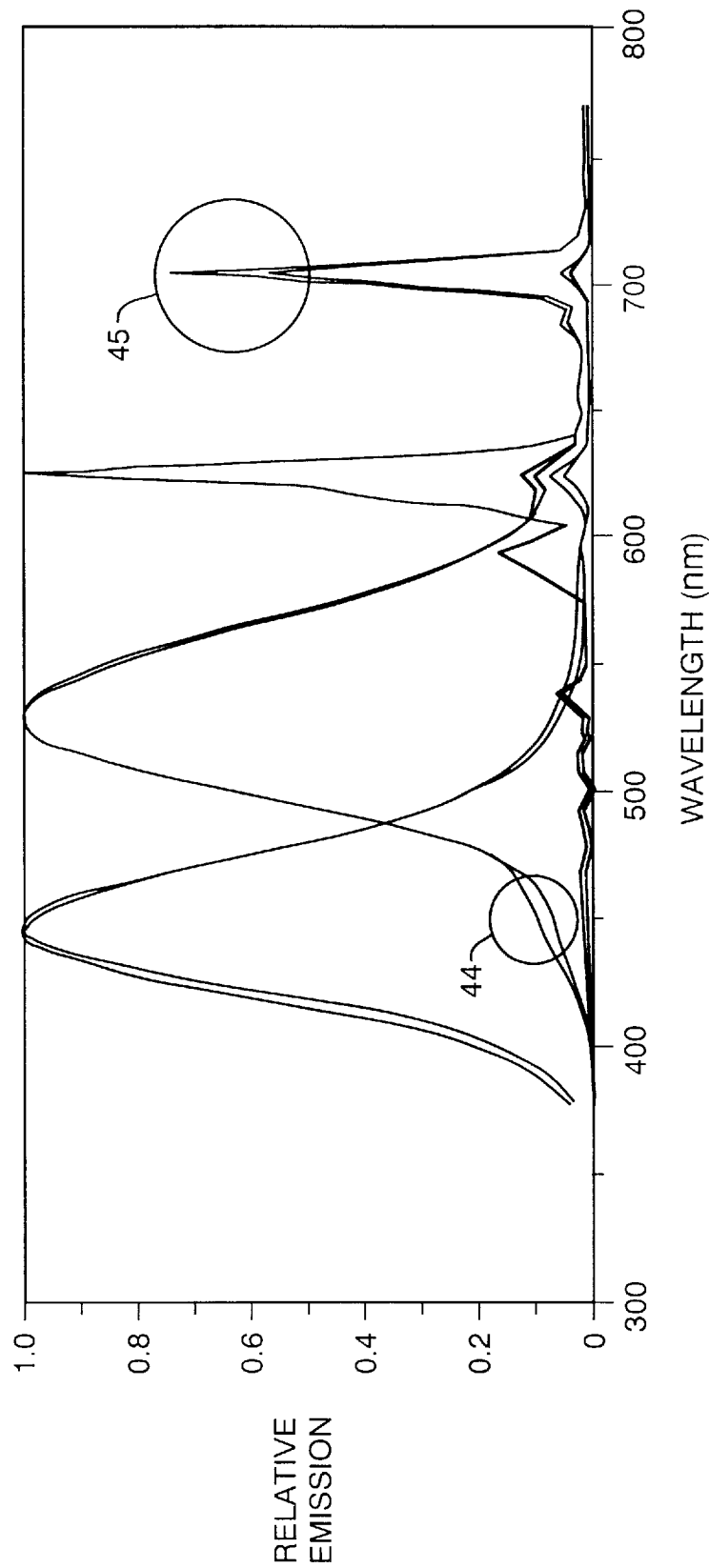
FIG. 8 is a representation of the spectrum of the emission of two common phosphors.

FIG. 8 is a representation of the spectral emission characteristics of the two prevelant phosphor family sets (Red Green and Blue) found in commercial displays, EBU and P22. Some areas of significant physical differences, (44), and (45) are highlighted in this figure.

Figure 9A:
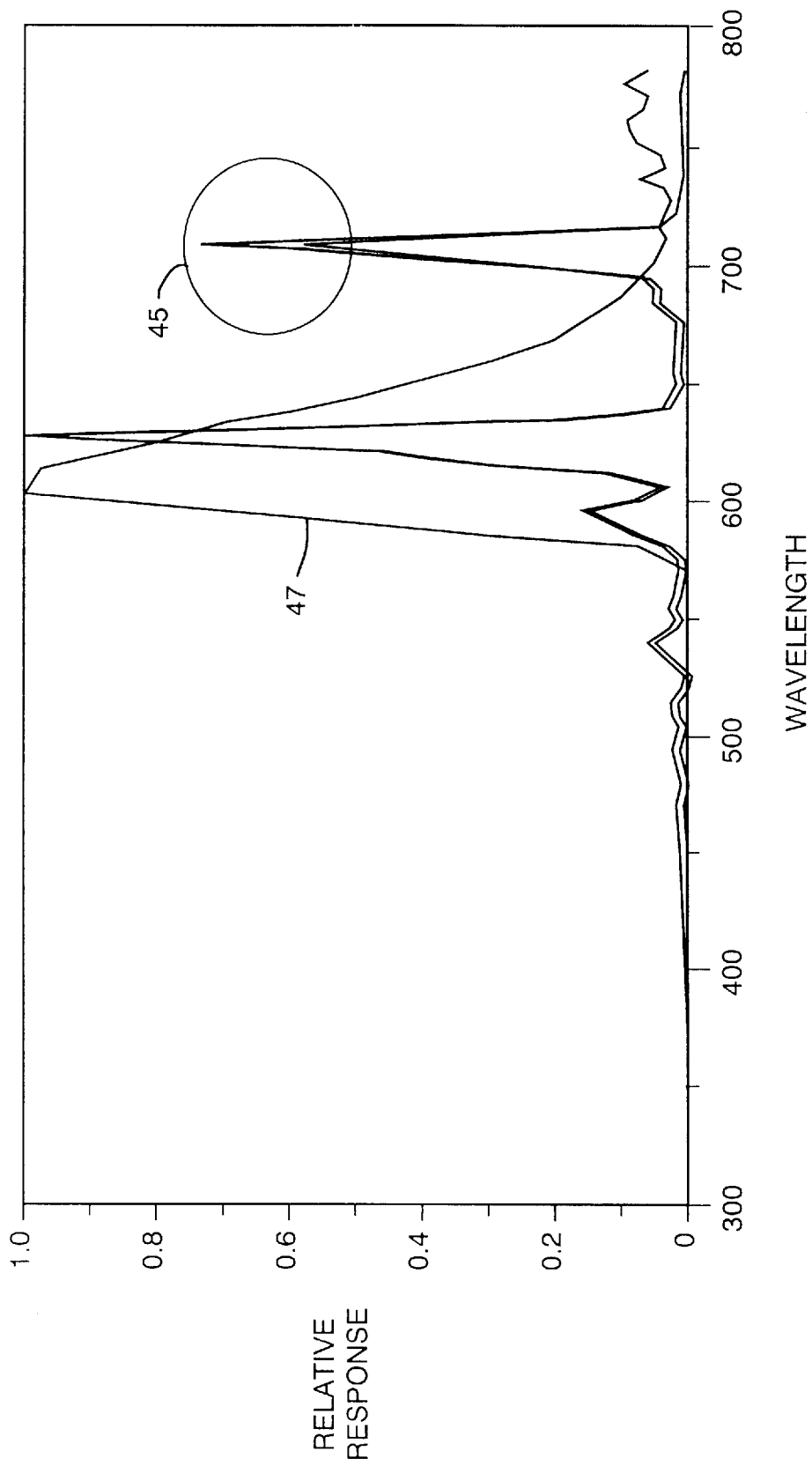
FIG. 9A is an expanded view of the red emission characteristics and the red sensitivity function.

FIG. 9A is a plot of the two red phosphors and the detector sensitivity. The areas of significant difference (45) are shown to have minimal response when compared to the detector sensitivity function (47) for the red phosphor.

Figure 9B:
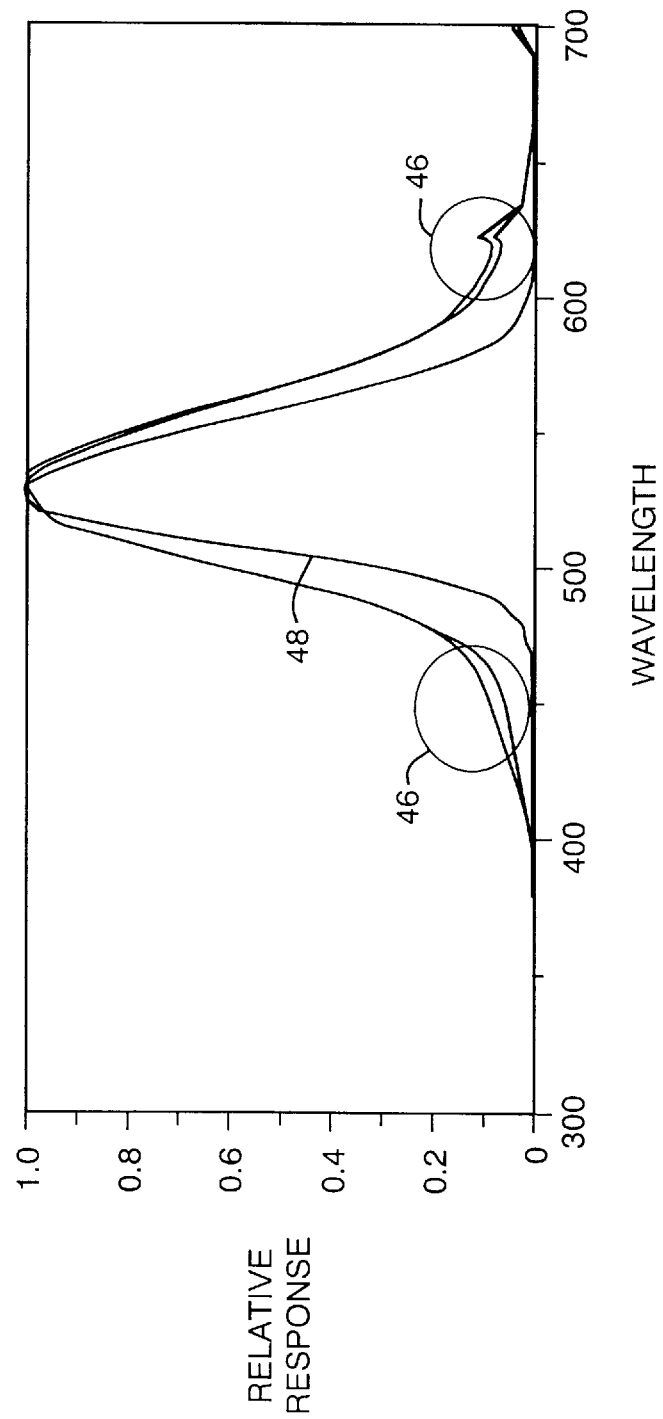
FIG. 9B is an expanded plot of the two green phosphors and the spectral response of the best mode colorimeter.

FIG. 9B is a plot of the two green phosphor sets and the corresponding spectral sensitivity curve which is used to exaime these sets. It is noted that the difference areas in the green (46) are not part of green sensitvity function (48).

The significant difference between this new invention and earlier designs is that the filters are designed to minimize the differences between the signal received from either phosphor set. Earlier designs emphasized the development of filters that when combined with a known detector sensitivity function, could be used to derive a response that closely matched the CIE color matching functions. This invention uses the apriori knowledge of the intended source distributions to mask differences between the sources. A single calibration matrix may then be used to map the measured signal to a calibrated CIE color space description.

FIG. 10 is a mathematical representation of the matrix solution used to derive the calibration matrix (49), from a corresponding set of calibration values (51) and a set of measured values (50).

FIG. 11 is a representation of the calibration station used to calibrate the colorimeter consisting of computer components (51), mounted colorimeter (52), Color CRT source (53) and color CRT source stabilization board (54).

FIG. 12 is a physical representation of the best mode device. FIG. 12 shows a cover (0), above a circuit board (1) containing the detectors and filter assembly (2) which captures illumination through diffuser whose field of view is limited by aperture (3), that is a molded element of base unit (4) that is attached to suction cup (5). Data is transmitted through cable (6) and connected to a host computer via connector 7.

Figure 13:
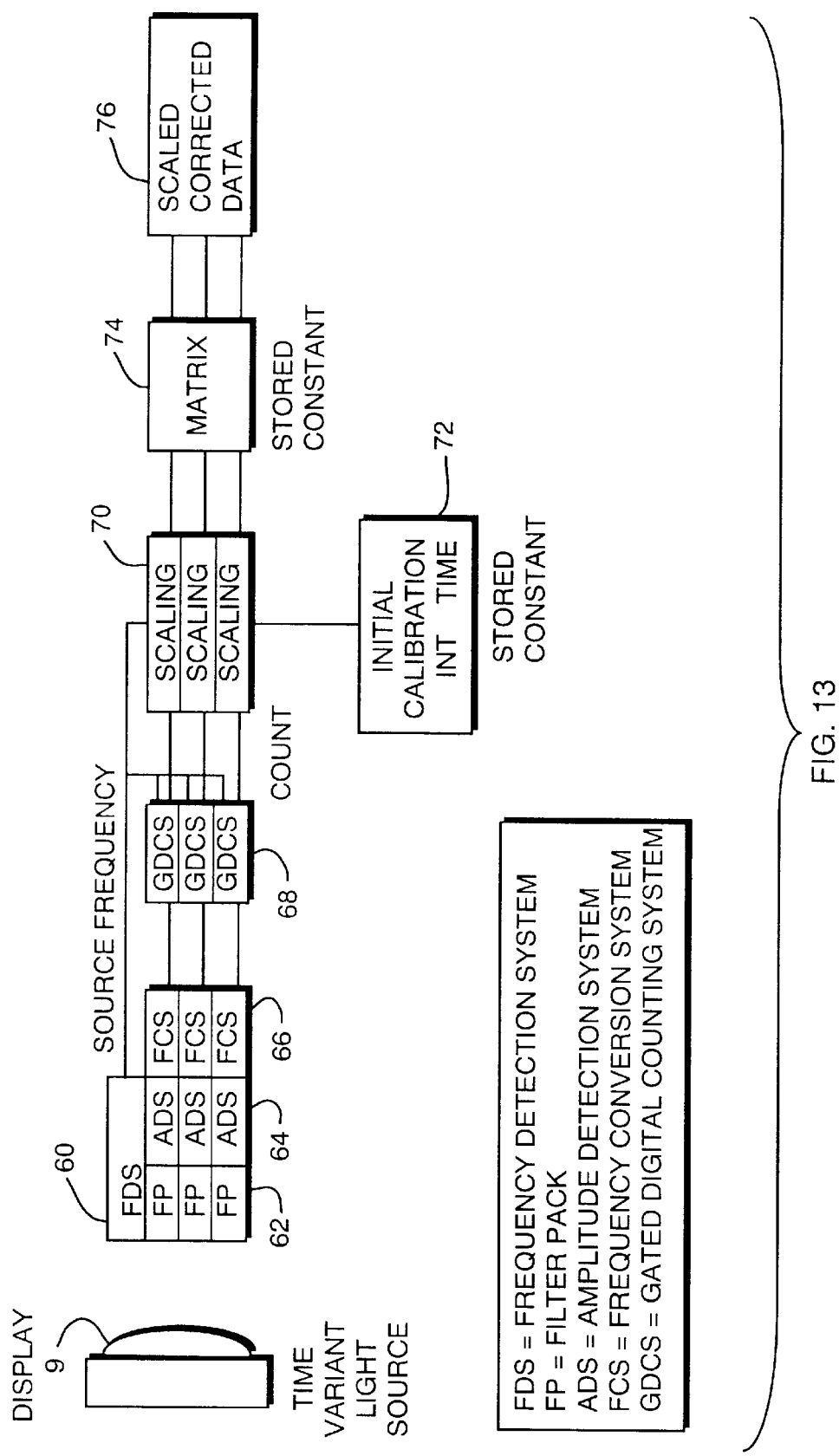
FIG. 13 is a block diagrammatic view of the elements of the system and illustrating their corresponding ship.

FIG. 13 illustrates the entire block diagram of the invention. The time variant light source (9) is incident upon the colorimeter (8) attached to the screen of the light source. The Frequency detector system (60) receives the unfiltered incident illumination. The filter pack (62) filters the incident illumination before it is received by the amplitude detection system (64) and the frequency conversion system (66). The gated digital counting system (68) determines the appropriate counting method and the resulting output goes through a scaling (70) process using the calibration stored constants (72). The correction matrix (74) uses the calibration data to correct for system inaccuracies, and the output is the scaled corrected data (76).

Figure 14:
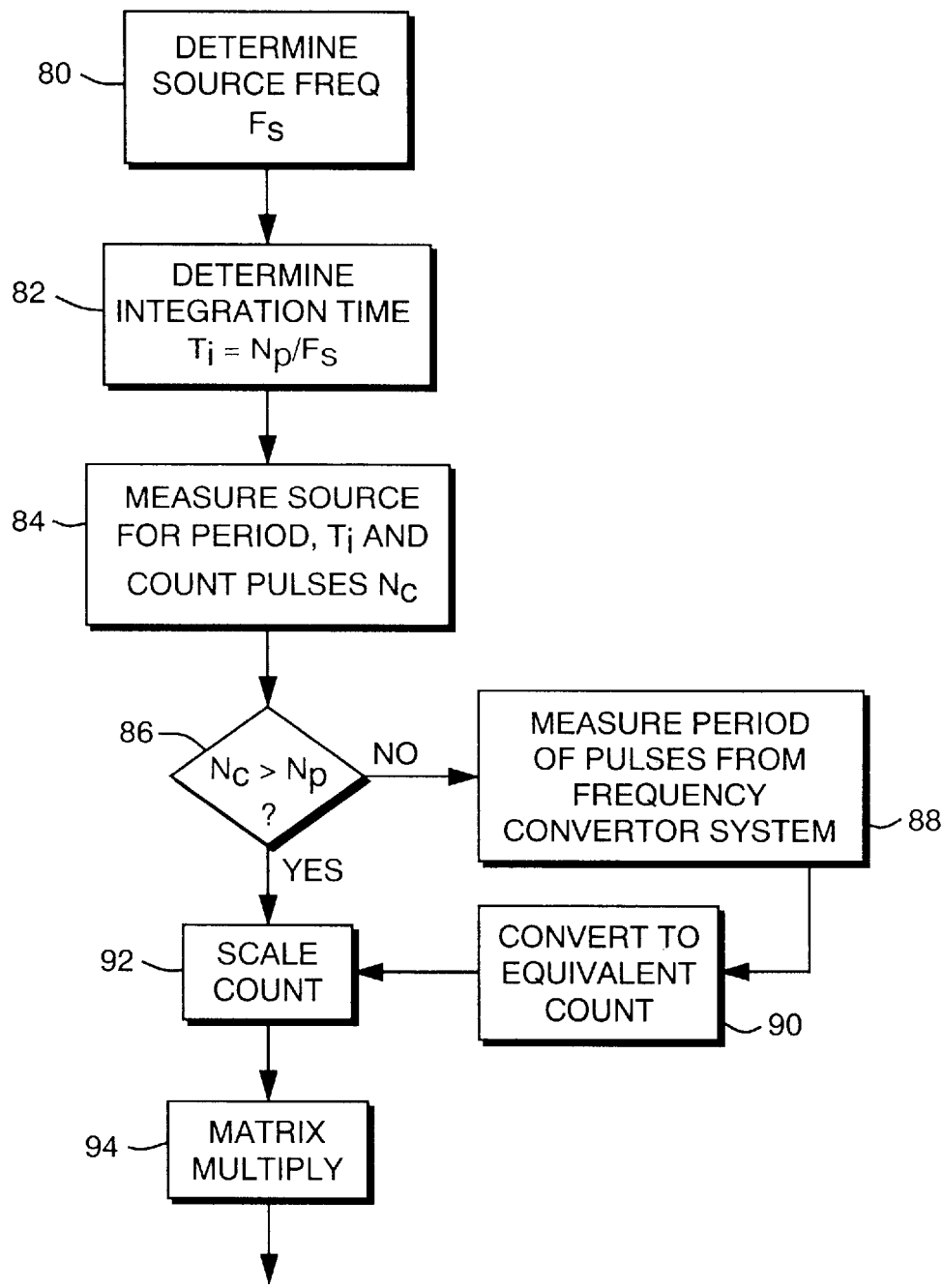
FIG. 14 is a flowchart of the steps in the calibration process.

FIG. 14 is a method flow chart showing the steps in the calibration process. The source frequency is measured (80) by the system. Then the integration time is calculated (82). The system measures the incident source signal (84), and the pulses are counted. If the number of counted pulses (Nc) is less than the source frequency period count, the system measures the period of pulses from the frequency converter system (88), and the number is converted (90) to an equivalent count. If Nc is greater than or equal to the source frequency period count the counted pulse number is used (86). This value is then scaled (92) and corrected by multiplication with the correction matrix (94).

Detailed Description of the Invention

The present invention is primarily designed to attach to the face of a Color CRT display. Referring now to FIGS. 1A and 1B we see the Colorimeter (8) attached to the nominal center of the CRT (9). The field of view of the colorimeter is such that it does not subtend the entire display surface. The CRT sweeps a predetermined number of lines horizonitally. After completing all the horizonal lines, the beam is turned off and returned to the top of the field to retrace the display once again. The time between two successive retraces is called the vertical refresh rate.

FIG. 2 is a representation of the circular field of view of the sensor system. This circular field of view contains a number of video raster lines. Because the field of view is circular, all raster lines do not have equal weight in the measurement. It is shown in FIG. 2 that the upper most raster line (10) is much shorter than the raster line in the center of the field (11).

FIG. 3 is a representation of the instantaneous illumination falling on the sensor with respect to time of the image in the field of view. As the raster lines accumulate within the field, one notes that there is an overall increase in signal with a period variation within the increasing edge (12). This periodic pattern is the result of the horizontal retrace of the video display. Each local peak represents a new raster line being exposed to the sensor through the circular aperture. The CRT generates light by causing a phosphor to emit light of a given color. The phosphor has a characteristic fall time or persistence. The persistence of the phosphor causes the raster line to glow longer than the time it takes to generate so the amount of light detected by the sensor increases overtime because multiple lines are glowing simultaneously.

After the rasters have been painted, the light signal decays (13). In order to correlate this signal with the human visual process, it is essential to integrate this signal and find the area under the curve (14). This must be done because the angular subtense of the eye and the response time of the eye are both greater than that of the measurement instrument. The CRT display is refreshed at a periodic rate that is faster than the response time of the eye. This rate is typically from 50 Hz to 85 Hz. When the response given in FIG. (3) is analyzed over longer periods, a periodic function is derived. FIG. 4 is a representation of this function. The time of integration may exceed a single vertical period of the monitor.

An examination of FIG. 4 shows that the vertical retrace time may be deduced by measuring the time between two falling edges (15). Knowledge of this time is critical because it is necessary to set the measurement integration time to be an integer multiple of the vertical retrace period. For purposes of definition, we term the system that does this, the SOURCE FREQUENCY DETECTION SYSTEM. FIG. 5B is a block diagram of the source frequency detection system. The system consists of a photodiode (25) and amplifier (26). The output of this stage is AC coupled (27) into a comparator (28). The output of this comparator is used to detect the frequency of the source being measured (FIG. 5C, 30). Another use of this sensor is to detect the occurrence of a random source for triggering a measurement. The sensor for the frequency detection system is in the same plane as the sensors used to detect color or luminance. This sensor is unfiltered as it is only used to check for source frequency. If the measurement period is not set properly there is a potential loss of accuracy due to missing a refresh. This is because the monitor source emits no light during this period, hence missing one pulse can have a large effect on the measurement. For example if roughly 20 integration periods were measured, different parts of the last pulse may be captured. In this example, the errors can be as large as 5% (1 part in 20).

A block diagram representation of the integration system is depicted in FIG. 5A. A photo diode (17) generates charge that is integrated by a charge integrator (18) and that is linearly related to the incident energy on the sensor. For purposes of definition we call this stage the AMPLITUDE DETECTION SYSTEM. The charge integrator then generates a current that is then converted to a frequency that is proportional to the current input to a current to current frequency converter (19). For purposes of definition, we term this section the FREQUENCY CONVERSION SYSTEM. In the current invention,the pulses generated by the current frequency converter are analyzed in one of two manners, based upon the level of integrated incident energy striking the detector. For purposes of definition, we term this section the GATED DIGITAL COUNTER SYSTEM. If the integrated incident energyas measured by the device produces a total count that is greater than the number of refresh fields that are being measured, the output frequency pulses are counted by a digital counter (20) over the integration time period that was determined by the measurement of the frequency of the monitor. For example, if the integration time was set to be 100 fields, and the resultant totalized count out of the frequency conversion section was 1000, then the digital counter (20) is used as the basis of the measurement. If the the integrated incident energy level is low, there will be very few pulses counted and the totalized count realized in digital counter (20) will be less than the total number of fields. When this condition is detected, an edge detector (22) is used to gate a counter that is counting a free-running crystal clock (24), or other clock of fixed and known frequency. This edge detector is triggred by a pulse from the frequency converter section. After triggering, the counter is now accumulating pulses at a precisely fixed interval. The edge detector gates this counter off when on the alternate transition of the clock pulse. The contents of this counter now contain be related to the time between pulses generated by the frequency conversion section.

FIG. 13 is a block diagram representation of the colorimeter that illustrates the realtionship between the physical systems, i.e. :Frequency Detection System, Filter Pack, Amplitude Detection System, Frequency Conversion System, Gated Digital Counter System and the computational elements of the process. The CRT Display system is a time variant light source. The Frequency Detection System determines the frequency of refresh of the CRT Display, the combination of the Filter Pack, Amplitude Detection System and Frequency Conversion system generates output pulses whose frequency is linearly related to the incident filtered energy striking the sensor in the Amplitude Detection System. An integration time, based upon an integer multiple of the refresh period (1/(refresh frequency), as determined by the Frequency Detection System, is used to gate the period of accumulating counters in the Gated Digital Counter System. Based upon the accumulated count in these counters, a decision is made to either pass the count on for scaling and calibration or to re-examine the pulse train using a method to determine the precise period of the pulse.

FIG. 14 is a flow chart that illustrates the steps in the process of deriving a calibrated value from the measurement: The first step is to determine the frequency of the source using the Source Frequency Detector. The next step is to determine the integration time. The integration time is based upon an arbitrarily selected number of periods of display refresh over which the display is to be measured. In the current embodiment, this number varies from 12 to 100 periods. This value is constant for a given display system, so it need be determined only once. The source is measured for this period and the number of counts accumulated by the counter (Nc), is compared to the number of periods that the measurement has occured over (Np). If Nc is greater than or equal to Np, the count is used. If Nc is less than Np, the measurement is made using the period measurement mode of the Gated Digital Counter System. This number is then passed to the scaling and matrix multiplication algorithms.

The integration in the present invention is accomplished in either light region, by simple accumulation or summing of pulses. The current invention eliminates mathematical accumulation and division operations that are required to analyze the complex waveform of the incomming signal. Calibration of this system of integration can be descibed as follows:

The colorimeter system is illuminated by a known and calibrated temporally varying light source. For each of the color channels, a total count is accumulated for this source over a time interval that has been determined to be an integer multiple of the refresh rate of the source. The length of time that the accumulation is allowed to occur is also recorded. Therefore we have a measure of a conversion factor which allows one to calculate the physical luminance measured as a function of the known integration time such that:

$$\text{Luminance} = k(I) * n \qquad \text{Eq. 1)}$$

where luminance is the value of the known and calibrated source, n is the number of counts that the system accumulated over an interval of I secs. The constant "k" is the calibration constant. It is often necessary to modify the intergration time based upon requirements of the measurement senario. If the integration interval is different than the original calibration interval, it is necessary to modify Eq. 1):

$$\text{Luminance} = (k(I) * I/t) * n \qquad \text{Eq. 2)}$$

where I is the original integration time and "t" is the new integration interval. In this embodiment of the invention, we term this corrected calibration value the "Time Corrected Calibration Constant"

In the current embodiment, a Texas Instrument TLS 235 light to frequency converter sensor is used to form the diode/charge-integrator, and current to frequency converter function. A MicroChip Pic17c42 processor is used to implement the 16 bit dual mode counter system.

FIG. 6 is a representation of the complete colorimeter system. The light to frequency sensors (34) are connected to counter inputs which can also be used for edge detection The frequency detect sensor is input to another port. The data is collected and analyzed by the microprocessor (36) and then sent to the host computer (38). The calibration data is stored in an EEPROM (39). In practice, the colorimeter can be used to measure the monitor that is connected to the computer, or it can be used to measure alternate sources.

As stated earlier, the integration process can occur either by accumulation of pulses, or by detecting the average period of the pulse. The total number of pulses accumulated over time is given by Eq. 3.

$$n(\tau) = \int f(t) dt \qquad \text{Eq. 3)}$$

where $\tau$ represents the time of integration, f(t) is the time variant frequency proportional to the intensity of illumination striking the sensor. As the intensity of the time variant illumination striking the sensor diminishes, the frequency produced by the sensor gets proportionately lower. Referring now to FIG. 4, the time between vertical refresh is Tr (labled 15) on the graph. When the light to frequency converter produces a frequency that is longer than this period, the value f(t) can be considered a constant. Under these conditions, Eq. 3 can be rewritten as:

$$n(\tau) \cong \alpha a^* F_c \qquad \text{Eq. 4)}$$

where $\alpha$ is a conversion constant and $F_c$ is the constant frequency at the current illumination level. At this lower light level, it is now possible to measure the period of the signal rather than the frequency. In this current embodiment, the switch to measuring period rather than frequency has the property of increasing resolution as the signal gets lower.

When the illumination level is low enough to be in the constant frequency region, the frequency can be calculated as the inverse of the period. Under these circumstances Equation 4 becomes:

$$n(\tau) \cong \alpha^* 1/P \qquad \text{Eq. 5)}$$

where $P_c$ is the period.

In this mode, a free runing clock is runing at a high frequency ($F_{fr}$) and is accumulated by a counter that is gated on and off by the pulse that is output from the photosensitive system. The total number of counts, $n_{fr}$, can be used to calculate the period as shown in Equation 6.

$$P = n_{fr}/(F_{fr}) \qquad \text{Eq. 6)}$$

Substitution of Equation 6 into Equation 5 yields Equation 7:

$$n(\tau) \cong \alpha^*(F_{fr})/n_{fr} \qquad \text{Eq. 7)}$$

When the counter gates only 1 period, the constant, $\alpha$, has a value of 1. If the counter is gated for n periods, the value of $\alpha$ is 1/n periods.

The number derived in Equation 7 can be used interchangebly with the number derived from Equation 1. Hence the same calibration data can be used for either case of the dual mode integration.

FIG. 7 is a representation of the construction of the filters which cover the sensor sets. The filters are constructed and of stacks of different colored material. All filter stacks share a common glass filter (39) which is used to limit the sensitivities in the near ultraviolet and in the red and neat infrared. This filter stack (40, 41) is surrounded by a plastic shroud (43) which shields the sensor from illumination that hasn't passed through the filter stack.

The selection of filter material is critical to the response of the instrument. In prior art, much work was applied to the design of filters which are representative of the human visual response. Such designs have been shown to be expensive and complex to manufacture. FIG. 8 is a representation of the spectrum of the emission of two common phosphors. Unlike the methods described in the prior art, the filters in this embodiment have been designed to minimize the difference between the phosphor sets. These differences occur in both the visible and non-visible regions of the spectrum. FIG. 8 shows the result of scaling the red, green and blue phosphors to their respective maxima.

FIGS. 9A, and 9B show the areas of maximum differenceces between the two phosphor families. FIG. 9B shows the an expanded plot of the two green phosphors and the spectral response of the best mode colorimeter. Note that the sensor sensitvity does not respond in the regions of greatest difference FIG. 9A is an expanded view of the red emission characteristics (45) and the red sensitvity function (47). The dominant region of difference is shown to be excluded by the detector sensitivity function.

The methodology used to design the filters may be described by the following steps:

1. Select the constituent phosphor families that are to be measured by the system under design.
2. Measure the spectrum of each phosphor contained in the family of phosphors.
3. Scale the measured spectra such that each phosphor is normalized by the maximum value.
4. Autocorrelate spectra of like hues.
5. Use the minima of the autocorrelation function to determine the location of the cutoffs for the filter.
6. Use the maxima of the autocorrelation functions to determine the center wavelength of the filter design.
7. Select appropriate filter media to achieve the bandpass and centerwavelength requirements.

The signals produced by sensor system are correlated with a spectrophotometer and then related to the human response system. Using the matrix solution presented in FIG. 10, a correction matrix can be calculated which allows the conversion the Red, Green, and Blue signals to CIE XYZ system of measurement.

In the current embodiment, a calibration station is to calibrate the instruments in production. The correction matrix (50) is determined by mounting the colorimeter on a servoed display system (53) (54) which has been calibrated using a spectrophotometer as a primary means of determining the colors presented by the CRT in terms of the CIE XYZ system of measurement. The servo system attached to the display system ensures that a reliable, calibrated set of colors will be displayed on the screen. The display CRT component of the calibration station (54) then presents the calibrated colors to the device under test under the control of the computer (51) . The display stabilization processor (54) monitors the realtime output of the display system and corrects for variations over time. The device under test measures the output of the stabilized and calibrated CRT and returns this data to the calibration station. The calibration station then computes a correction matrix by solving for the equation shown in FIG. 10.

The goal of the equation described by FIG. 10 is to determine a matrix A (49) knowing the data as measured by a spectrophotmeter (51) and the data as measured by the colorimeter under test (50). The solution to solve for matrix A (49) knowing the calibration data C (51) and the measured data B (50) follows in the following set of equations:

$$[C]=[A]^*[B] \text{ where [ ] indicate a matrix.} \qquad \text{Eq. 8)}$$

Both sides of equation 8 are multiplied by the Transpose of matrix B $$[C]^*[B]^t=[A]^*[B]^*[B]^t \qquad \text{Eq.9)}$$

The expression $[B]^*[B]^t$ is by definition a square matrix and therefore invertable. Multiplying both sides of Eq. 9 by the inverse of this matrix and collecting terms yields the following:

$$[A]=[C]^*[B]^t*([B]^*[B]^t)^{-1} \qquad \text{Eq. 10)}$$

The calibration station then programs the device under test with a serial number, a correction matrix, the frequency of the station and integration time of the measurements. This data is then used by the application software to scale measurements made on unknown devices to a calibrated state. The calibration station records the raw data measurements and measurement results in a data base that is used for statistical tracking of the manufacturing process.

A complete colorimeter is represented in FIG. 12. FIG. 12 is a physical representation of the best mode device. FIG. 12 shows a cover (0), above a circuit board (1) containing the detectors and filter assembly (2) which captures illumination through diffuser whose field of view is limited by aperture (3), that is a molded element of base unit (4) that is attached to suction cup (5). Data is transmitted through cable (6) and connected to a Host computer via connector (7).

As will be realized, the invention is capable of other and different embodiments, and its several details are capable of modifications in various obvious respects, all without departing from the essence of the invention.

We claim the following:

1. An apparatus used to measure luminance characteristics of temporally variant light sources comprising:
   a source frequency detection section for detecting periodic incident illumination from said temporally variant light sources and determining a temporally variant light source frequency, wherein said temporally variant light source frequency is used to determine an integration time interval and wherein said integration time interval is an integer multiple of a period of said temporally variant light source;
   an amplitude detection section, consisting of one or more light intensity sensors and corresponding filter packs, wherein said light intensity sensors and corresponding filter packs have a combined spectral response characteristics that corresponds to a C.I.E. photopic response function, and wherein said amplitude detection section generates an incident energy current output signal that is linearly related to a light intensity of said temporally variant light sources;
   a frequency conversion section connected to said amplitude detection section that produces a frequency output signal from said incident energy current output signal, wherein said frequency output signal is proportional to said incident energy current output signal;
   a gated digital counter section connected to said frequency conversion section, wherein a pulse train from a high frequency output is counted by a digital counter for an integral number of periods of said periodic incident illumination, and wherein a pulse train from a low frequency output is converted into a low frequency pulse train whose period is determined utilizing an edge detector to gate a counter that accumulates output clock pulses of a free running clock at a fixed frequency, said output clock pulses of said counter being linearly related to said period of said low frequency pulse train;
   a means for storing calibration data for said amplitude detection section, said frequency converter section, and said gated digital counter section including values of a calibration source frequency, an integration time at calibration, and a set of calibration scaling constants for each filtered amplitude detection channel;
   a means for recalling said calibration data; and
   a processing means for processing data from said amplitude detection section, said frequency converter section, and said gated digital counter section, to determine a calibrated luminance measurement.

2. An apparatus according to claim 1, wherein said high frequency output occurs when said frequency output signal is greater than or equal to said temporally variant light source frequency, and wherein said low frequency output occurs when said frequency output is less than said temporally variant light source frequency.

3. An apparatus used to measure colorimetric characteristics of temporally variant light sources comprising:
   a source frequency detection section for detecting periodic incident illumination from said temporally variant light sources and determining a temporally variant light source frequency, wherein said temporally variant light source frequency is used to determine an integration time interval such that said integration time interval is an integer multiple of a period of said temporally variant light source;
   an amplitude detection section, consisting of one or more light intensity sensors and corresponding filter packs for each color channel, wherein said light intensity sensors and corresponding filter packs have a combined spectral response characteristics that nominally correspond to a 1939 C.I.E. Color Matching response function, and wherein said amplitude detection section generates an incident energy current output signal that is linearly related to a light intensity of said temporally variant light sources for said each color channel;
   a frequency conversion section connected to said amplitude detection section that produces a frequency output signal from said incident energy current output signal, wherein said frequency output signal is proportional to said incident energy current output signal;
   a gated digital counter section connected to said frequency conversion section, wherein a pulse train from a high frequency output is counted by a digital counter for an integral number of periods of said periodic incident illumination, and wherein a pulse train from a low frequency output is converted into a low frequency pulse train whose period is determined utilizing an edge detector to gate a counter that accumulates output clock pulses of a free running clock at a fixed frequency, said output clock pulses of said counter being linearly related to said period of said low frequency pulse train;
   a means for storing calibration data for said amplitude detection section, frequency converter section, and counter section, wherein said calibration data is used to convert a set of raw data into CIE tri-stimulus XYZ values, and wherein said calibration data includes values of a calibration source frequency, an integration time at calibration, and calibration scaling constants for said each color channel;
   a means for recalling said calibration data; and
   a processing means for processing data from said amplitude detection section, said frequency converter section, and said gated digital counter section, to determine a calibrated colorimeteric measurement presented in C.I.E. XYZ values.

4. The apparatus of claim 3, further comprising:
   an optical filter unit comprised of individual said corresponding filter packs coupled to each of said one or more light intensity sensors, wherein said corresponding filter packs filter according to a group of specific phosphor types (P22 and EBU) and constituent chemical families used to produce said phosphor types.

5. The apparatus of claim 3, wherein said corresponding filter packs consist of one or more sheets of optical filter material that combine to limit a spectral transmission of said periodic incident illumination, produced by said temporally varying light sources of said specific phosphor types, to a pre-calculated band of distinct hue centered at a specific wavelength and with a known bandpass, wherein said known bandpass is designed to minimize said spectral transmission of areas of large spectral differences between said specific phosphor types, and wherein said center wavelength is set at or near the average maximum wavelength of emission of each constituent hue of each said phosphor types.

6. The apparatus of claim 4, wherein said optical filter unit blocks said periodic incident illumination below 400 nm and above 700 nm, wherein said optical filter unit is used without regard to center wavelength of each of said filter packs, and wherein said optical filter unit defines a lower edge of a low wavelength filter pack and an upper edge of a high wavelength filter pack.

7. The apparatus of claim 5 wherein one said color channel has a center wavelength of 450 nm with a bandpass of 100 nm, another said color channel has a center wavelength of 540 nm with a bandpass 100 nm, and yet another said color channel has a center wavelength of 600 nm with a bandpass of −10 nm and +80 nm.

8. An apparatus used to calibrate a colorimeter comprising:
   A display means capable of producing a plurality of known time variant color signals;
   A stabilization means to stabilize said display means;
   A control means to set said display to a known and stable color;
   A calibrated spectrophotometer to measure colorimetric data of said known and stable color;
   A storage means to store said colorimeteric data for said known and stable color;
   A control means to command said colorimeter to make a measurement of said known and stable color;
   A communications means to receive said measurement from said colorimeter;
   A memory means to record said measurement made by said colorimeter including a calibration integration time and a display frequency;
   A processing means to calculate a correction matrix for said colorimeter using said measurement from said colorimeter and said colorimetric data from said spectrophotometer;
   A memory means to record said correction matrix and said calibration integration time and said display frequency;
   A communication means for communicating said matrix and said calibration integration time and said display frequency to colorimeter.

9. A method of measuring a temporally varying light source consisting of the steps:
   Providing a display of an unknown time variant signal with an incident illumination;
   Attaching a colorimeter to said display;
   Measuring a source frequency for said incident illumination;
   Filtering said incident illumination generated by said unknown time variant signal through at least one filter and sensor set to produce a filtered output response;
   Converting said filtered output response to a current output, wherein said current output is proportional to said incident illumination;
   Converting said current output response to a frequency output, wherein said frequency output is proportional to said current output;
   Counting a set of pulses of said frequency output over a fixed period for each said sensor set;
   Detecting a time period between two successive pulses of said frequency output for each said sensor set;
   Sensing an average level of illumination that generated said pulses and said time for each sensor set;
   Selecting said pulse count if said average level of illumination is greater than a predetermined light intensity level, or selecting said pulse period if said average level of illumination is equal to or less than said predetermined light intensity level and converting said pulse period to an equivalent said pulse count for each sensor set;
   Multiplying said pulse count by a stored calibration factor to form a measurement response;
   Storing said a measurement response for each sensor set;
   Recalling said measurement response from each of said sensors;
   Multiplying each said measurement response by a calibration factor to yield a measurement product; and
   Computing the sum of said measurement products.

10. A method according to claim 9, wherein said varying light source is monochromatic.

11. A method according to claim 9, wherein said varying light source is color.

12. A method for calibrating a colorimeter and measuring a temporally varying source, consisting of the steps of:
   Providing a display of a known time variant signal with an incident illumination;
   Controlling said display to display a plurality of known and stable signals;
   Measuring a measurement set for each said plurality of known and stable signals;
   Correlating each recorded said measurement set with each said known and stable signals;
   Storing a set of calibration constants including an integration time and a display frequency into a memory location of said Colorimeter,
   Calculating a correction matrix using the methods of least squares;
   Storing said correction matrix into a memory location in said colorimeter;
   Providing a display of an unknown time variant signal with an incident illumination
   Controlling said display to display said unknown time variant signal;
   Measuring a source frequency for said incident illumination;
   Filtering said incident illumination generated by said unknown time variant signal through at least one filter and sensor set to produce a filtered output response;
   Converting said filtered output response to a current output, wherein said current output is proportional to said incident illumination;
   Converting said current output response to a frequency output, wherein said frequency output is proportional to said current output;
   Counting a set of pulses of said frequency output over a fixed period for each said sensor set;
   Detecting a time period between two successive pulses of said frequency output for each said sensor set;
   Sensing an average level of illumination that generated said pulses and said time for each sensor set;

Selecting said pulse count if said average level of illumination is greater than a predetermined light intensity level, or selecting said pulse period if said average level of illumination is equal to or less than said predetermined light intensity level and converting said pulse period to an equivalent said pulse count for each sensor set;

Multiplying said pulse count by a time based correction factor to form a measurement response;

Storing said a measurement response for each sensor set;

Recalling said measurement response from each of said sensors;

Multiplying each said measurement response by a calibration factor to yield a measurement product; and Computing the sum of said measurement products.

13. A method according to claim 12 wherein said varying light source is monochromatic.

14. A method according to claim 12 wherein said varying light source is color.

* * * * *